June 13, 1967  C. H. MOORE  3,325,040
REMOVABLE CLOSURE FOR PRESSURE VESSELS
Filed Jan. 18, 1965  2 Sheets-Sheet 1
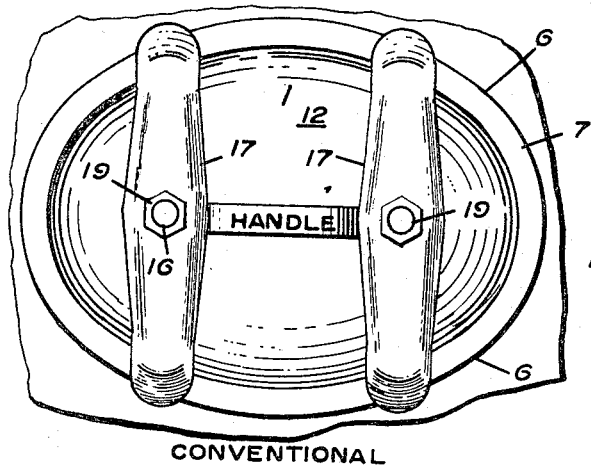
Fig. 1
CONVENTIONAL
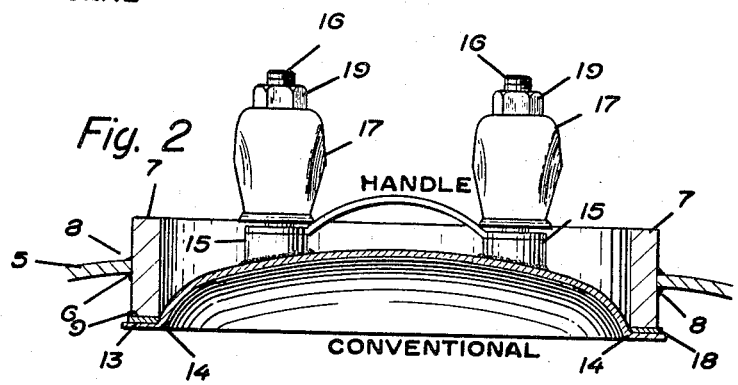
Fig. 2
CONVENTIONAL
INVENTOR
Charles H. Moore
BY  Geib and Porter
ATTORNEYS June 13, 1967 C. H. MOORE 3,325,040
REMOVABLE CLOSURE FOR PRESSURE VESSELS
Filed Jan. 18, 1965 2 Sheets-Sheet 2
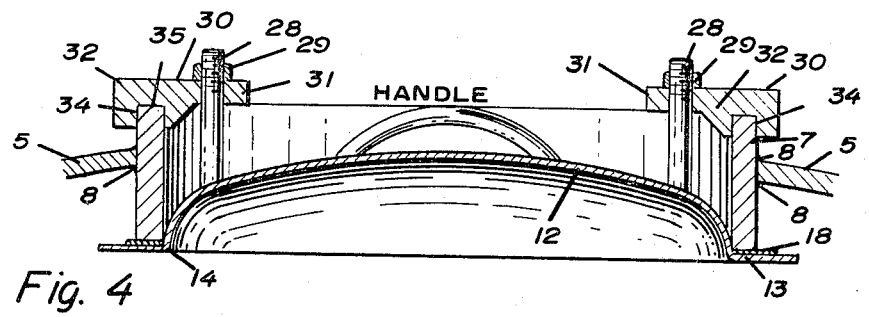
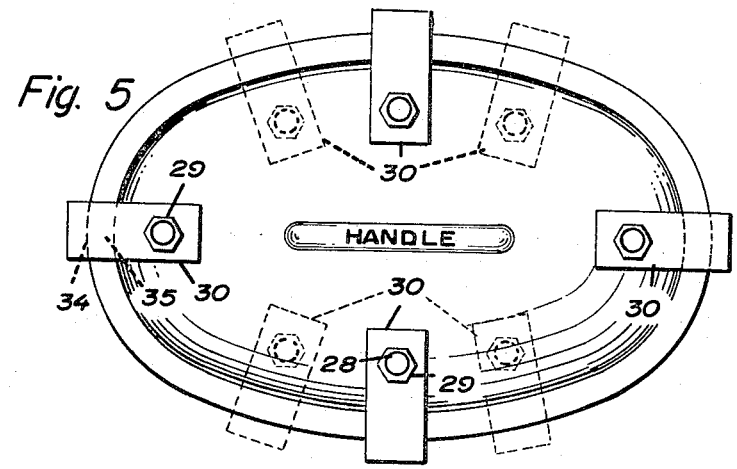
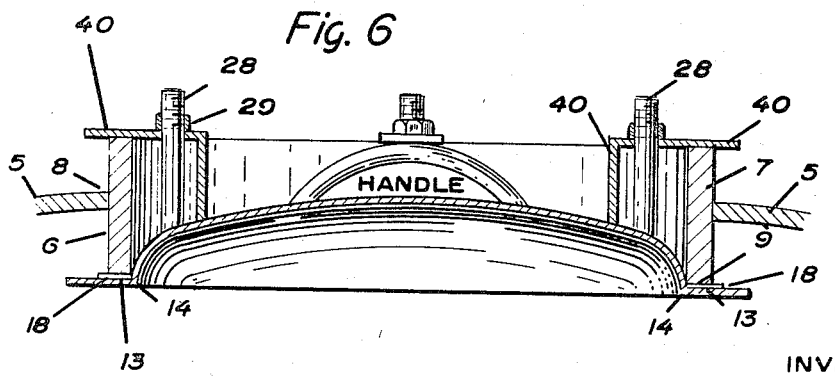
INVENTOR
Charles H. Moore
BY Geib and Porter
ATTORNEYS

United States Patent Office 3,325,040
Patented June 13, 1967

3,325,040
REMOVABLE CLOSURE FOR PRESSURE VESSELS
Charles Hewes Moore, R.D. 4, West Chester, Pa. 19380
Filed Jan. 18, 1965, Ser. No. 426,128
3 Claims. (Cl. 220—25)

This invention relates to pressure vessels and particularly closures therefor which are removable for inspection purposes, etc.

Construction codes and insurance regulations require that closed tanks, boilers and other pressure vessels shall have access or inspection openings of such type and size as the construction will permit. Section 1 of Power Boiler Code P-258 requires 2¾" x 3½" or larger Handholes or Manholes in sizes 11" x 15" or 10" x 16" or larger. Section VIII of the Unfired Vessel Code—Par. U.G. 46 requires vessels from 12" diameter to 18" diameter to have two handholes or two 1½" threaded openings, from 18" diameter to 36" diameter vessels to have one Manhole or two Handholes or two 2" threaded openings and vessels over 36" diameter are required to have one Manhole or two 4" x 6" Handholes. At the present time elliptical Handholes are made in 4" x 6", 5" x 9", 6" x 8" and 8" x 10" sizes, and Manholes in sizes 10" x 16", 11" x 15", 12" x 16", 14" x 18" and 18" x 24".

Pursuant to the practice well known to those skilled in the art, structures of the class described utilize a metallic ring which is disposed in the opening in the pressure vessel and continuously welded to the adjacent edges thereof, the closure for the opening being disposed interiorly of the vessel and provided with a portion adjacent its periphery which is adapted to underlie the inner edge of the metallic ring. The inner edge of the metallic ring is machined. The corresponding portion of the adjacent side of the closure is "coin-pressed" flat and in addition is sometimes machined. An intermediately disposed gasket is employed to prevent leakage between the inner edge of the metallic ring and the matching portion of the closure, such leakages occurring from low pressures or vacuum as well as from higher pressures within the pressure vessel. Numerous types of gaskets are employed, depending upon the particular circumstances: for example, soft asbestos, rubber, metal-jacketed asbestos, soft metals such as copper, non-ferrous materials including Teflon or the Chevron type with filler material which is harder than soft asbestos or rubber.

Various structures have been proposed for engaging the upper surface of the closure and pulling it into contact with the gasket. In situations where the pressure within the vessel is of a high order, it frequently happens that the internal pressure is more than adequate to hold the closure against the gasket with sufficient force to produce the desired sealing effect. Examples of such holding means are disclosed in my United States Patent No. 2,760,670 dated Aug. 28, 1956, and in my Canadian Patent No. 680,601 dated Feb. 25, 1964.

In situations where the pressure within the vessel is inadequate to hold the closure tightly against the gasket with sufficient force to effect a seal due to vacuum or pressures of only 5 or 10 pounds, the means for engaging the top of the closure and pulling it against the gasket must be relied on for this purpose.

Therefore, it is highly desirable that all such means for engaging the top of the closure and pulling it against the gasket be of sufficient strength to effect a proper seal even though it is known in advance that the vessels on which they are to be employed will contain very high pressures.

So far as I am aware, there is no prior art device which is capable of exerting sufficient force on the closure to effect a seal when a gasket of one of the harder materials is employed: nor am I aware of a prior art device which will effect a proper seal with the common soft gaskets if the pressure in the vessel is at vacuum or very low, i.e. gauge pressure of say 15 pounds per square inch or less.

It is among the objects if the present invention to provide, in a removable closure of the type described, a vastly improved means for holding said closure against the gasket, including gaskets of the harder materials which have come into common usage.

Another object is provision of an improved structure for obtaining the desired seal regardless of whether the pressure within the vessel is extremely high or extremely low and regardless of whether the gasket is of hard or soft material.

Still another object is the attainment of the foregoing ends with a structure which is simple and inexpensive to manufacture, quick and easy to install or dismantle, and durable in service.

With the foregoing objects in view, together with others which will appear as the description proceeds, the invention comprises the novel construction, combination and arrangement of parts, all as will be described more fully hereinafter, illustrated in the drawings, and particularly pointed out in the claims.

In the drawings:

FIGURE 1 is a plan view of a conventional structure which the device of the present invention is intended to replace;

FIGURE 2 is a longitudinal elevational view, partly in section, of the conventional structure of FIGURE 1;

FIGURE 4 is a longitudinal elevational view, partly in section, which further illustrates the structure of FIGURE 3;

FIGURE 5 is a view which is a plan view, similar to FIGURE 3, but disclosing a modified form of the invention; and FIGURE 6 is a view similar to FIGURE 4 but disclosing a modified form of lug or clamping member.

Figure 3:
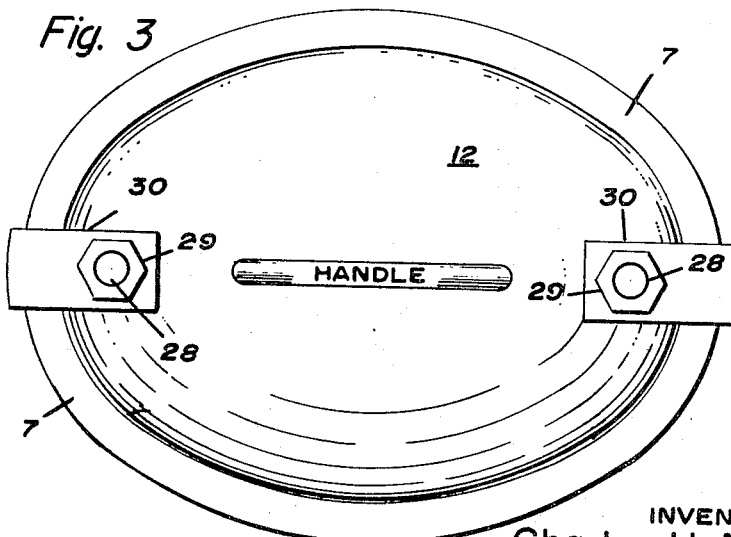
FIGURE 3 is a view which is similar in nature to that of FIGURE 1 but which illustrates a structure embodying the teachings of the present invention.

Referring more particularly to the drawings and especially the conventional structure of FIGURES 1 and 2, the numeral 5 indicates the shell of a high pressure vessel with which the manhole or handhole fitting is associated, the vessel being provided with an opening, in this instance of elliptical shape, as indicated at 6. This conventional fitting includes a relatively heavy steel ring 7 of a size and shape corresponding to the opening 6 in the shell of the pressure vessel, and is of a depth substantially greater than the thickness of the shell. The ring 7 is fitted snugly within the opening 6 substantially midway of its depth so that a portion thereof will extend the interior of the vessel with the upper end of the ring projecting materially beyond the outer surface of the vessel.

The lower or inner end of the ring 7 provides a bearing face 9, which is disposed at substantially right angles to the axis of the ring.

The closure or cover member comprises a dome-shaped forged steel plate represented generally at 12 of a shape to correspond with the ring 7, and provided with a marginal ring-like figure 13 disposed right-angularly with respect to the axis of the opening. The flange 13 is of equal thickness with the cover plate 12 and merges with the latter in a curved fillet indicated at 14, the flange being so formed as to parallel the bearing surface 9 of the ring 7.

Referring still to FIGURES 1 and 2, the cover 12 is conventionally provided with upstanding spaced bolt clips 15 to receive the lower or headed ends of inverted bolts 16. The upper or outer ends of the inverted bolts 16 pass through and project from correspondingly spaced openings in a yoke 17 which is disposed in the major axis of the cover plate and of sufficient length to rest at its ends upon the outer or upper edges of the ring 7. A pair of yokes 17 is illustrated in FIGURES 1 and 2 but sometimes an enlarged single yoke member is used in lieu thereof: as shown for example in my aforementioned Patent No. 2,760,670.

The lower bearing face 9 of the ring 7 and the upper edge of the flange 13 of the cover 12 are machined or "coin-flattened" and accommodate between them the usual gasket 18.

It is apparent that with the parts of the hereinbefore described conventional structure assembled in the manner disclosed by FIGURE 2, and the nuts 19 tightened upon the bolts 16, the cover plate 12 will be drawn toward the yoke 17 so as to bring about engagement between the upper edge of flange 13 and the gasket 18 interposed between the said flange and the bearing face 9 on the lower or inner end of the ring 7.

In assembling the cover plate 12 along the underside or lower end of the ring 7, it is most important to line up the elliptical shapes of these elements so that the gasket 18 is not "pinched." In doing this from outside of the vessel the yokes 17 of the conventional structure of FIGURES 1 and 2 obscure the operator's vision and make this task difficult.

Another disadvantage of conventional structures of the type shown in FIGURES 1 and 2 is the difficulty encountered during dismantling for inspection purposes, etc., in handling a large number of parts, namely two nuts, two yokes, two bolts, one cover plate and one gasket: a total of eight separate pieces.

As stated earlier herein, the purpose of the present invention is not only to reduce the above difficulties but, among other advantages, to provide a highly efficient manhole or handhole that is far cheaper to produce.

According to the teachings of the present invention the structure of FIGURES 3 and 4 is substituted for the conventional structure of FIGURES 1 and 2, the improvement residing in the novel means for pulling the closure plate 12 against the gasket 18 at the inner end or surface of the ring 7 which is continuously welded to the pressure vessel 5.

In lieu of the clip plates 15 for receiving the heads of the inverted bolts 16, as embodied in the conventional structure of FIGURE 2, right-angularly extending stud bolts 28 are welded to the top of the closure plate 12 at appropriately spaced positions, the same being disposed inwardly of, but in spaced parallelism with, the ring 7.

Two stud bolts 28 are schown in the plan view of FIGURE 3, and this number will be found adequate for many installations.

The outer ends of the stud bolts 28 are threaded and extend for a material distance beyond the outer end or surface of the ring 7.

In lieu of the yokes 17 of the conventional structure of FIGURES 1 and 2, there is provided a lug or clamping member 30 which comprises an L-shaped structure with a foreshortened leg portion 31 and a foreshortened foot portion 32. According to this embodiment of the present invention, this foreshortened foot portion 32 is enlarged and provided with a recess having straight sides 34 and 35 which are in parallelism and spaced apart a sufficient distance to accommodate the upper ends of the side edges of the ring 7. The bottom of the recess in the foreshortened foot portion 32 is also straight and extends at right angles to the straight sides 34 and 35 for making contact with the outer end or surface of the ring 7.

The foreshortened leg portion 31 of the improved lug or clamping member 30 extends inwardly with respect to the ring 7 only to the extent of permitting the formation of an aperture for receiving the upper end of one of the stud bolts 28.

The improved structure of FIGURES 3 and 4 provides rigidity of the lugs or clamping members 30 with respect to the closure plate 12 due to the contact of the straight side walls 34 and 35 of their recesses with the upper portion of the inner and outer surfaces of the ring 7; and tightening of the nuts 29 draws the upper edge of the flange 13 of the closure plate 12 into firm contact with the gasket 18. It will be understood that if desired the side walls 34 and 35 of the recess in the lugs or clamping members may be curvilinear in order to conform to some extent to the contour of the ring 7.

Referring to FIGURE 5, the teachings of the present invention contemplate an increase in the number of stud bolts 28 and lugs or clamping member 30 over the pair of these instrumentalities which is shown in FIGURES 3 and 4. This increase in number of securing or clamping instrumentalities is particularly helpful when using gaskets of the harder materials referred to earlier herein or to seal the softer gaskets at vacuum or low pressures of 5, 10 or 15 pounds per square inch.

Referring to FIGURE 6, a further modification of the teachings of the present invention comprises an L-shaped lug or clamping member 40. These L-shaped lugs or clamping members 40 are provided with apertures in their leg portions for receiving the stud bolts 28. The outer end of the foot portion of each of these L-shaped lugs or clamping members 40 is positioned to extend inwardly with its terminus in contact with the outer surface of the dome-shaped portion of the closure plate 12.

The leg portion of each of the L-shaped lugs or clamping members 40 is elongated to extend over, and into contact with, the outer end or surface of the ring 7.

According to the foregoing construction and arrangement, the lugs or clamping members 40 bear both on the outer end or surface of the ring 7 and the top of the dome-shaped portion of the closure plate 12; and the tightening of the nuts 29 on the threaded upper portions of the stud bolts 28 will very effectively pull the upper edge of the flange 13 of the closure into firm contact with, and compress the gasket 18.

It will be seen that when using either the lugs or clamping members 30, or the modified lugs or clamping members 40, the vision of the operator in aligning the closure plate 12 with the underside of the ring 7 will not be obscured as in the case of the yokes 17 of the conventional structure of FIGURES 1 and 2. Also there are fewer parts to be handled in assembling and dismantling.

In addition the lugs or clamping members 30 and 40 are less costly than the conventional yokes 17 and the shorter stud bolts 28 are less costly than the inverted bolts 16 which are held in the conventional bolt clips 15.

Further, the welding of the unthreaded ends of the stud bolts 28 to the upper surface of the dome-shaped portion of the closure 12 is less costly than the utilization of the conventional bolt clips 15.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A closure fitting for application to an opening in a pressure vessel comprising, in combination, a ring having spaced parallel inner and outer ends; said ring being welded around its periphery to the edge of the opening in said pressure vessel; a closure plate for removable disposition in said pressure vessel; the central portion of said closure plate being dome-shaped and extending partially into the area delineated by said ring; the peripheral portion of said closure plate providing a continuous flange to underlie the inner end of said ring; a gasket disposed between said flange and the inner end of said ring; a plurality of stud bolts secured to the outer surface of the dome-shaped central portion of said closure plate;

a plurality of lug members; each of said lug members to make contact with the outer end of said ring and having an aperture for receiving one of said stud bolts in projecting relationship with respect thereto; and a nut on the outer end of each of said stud bolts; each of said lug members terminating short of the center of the dome-shaped portion of said closure plate.

2. A closure fitting for application to an opening in a pressure vessel comprising, in combination, a ring having spaced parallel inner and outer ends; said ring being welded around its periphery to the edge of the opening in said pressure vessel; a closure plate for removable disposition in said pressure vessel; the central portion of said closure plate being dome-shaped and extending partially into the area delineated by said ring; the peripheral portion of said closure plate providing a continuous flange to underlie the inner end of said ring; a gasket disposed between said flange and the inner end of said ring; a plurality of stud bolts secured to the outer surface of the dome-shaped central portion of said closure plate; a plurality of substantially L-shaped lug members; each of said substantially L-shaped lug members to make contact with the end of said ring and with the dome-shaped portion of said closure plate, the intermediate portion of each of said substantially L-shaped lug members having an aperture for receiving one of said stud bolts in projecting relationship with respect thereto; and a nut on the outer end of each of said stud bolts; each of said lug members terminating short of the center of the dome-shaped portion of said closure plate.

3. A closure fitting for application to an opening in a pressure vessel comprising, in combination, a ring having spaced parallel inner and outer ends; said ring being welded around its periphery to the edge of the opening in said pressure vessel; a closure plate for removable disposition in said pressure vessel; the central portion of said closure plate being dome-shaped and extending partially into the area delineated by said ring; the peripheral portion of said closure plate providing a continuous flange to underlie the inner end of said ring; a gasket disposed between said flange and the inner end of said ring; a plurality of stud bolts secured to the outer surface of the dome-shaped central portion of said closure plate; a lug member for each of said stud bolts; each of said lug members having a slot for receiving a substantial portion of the outer end of said ring; each of said lug members to extend partially over said closure plate and having an aperture for receiving one of said stud bolts in projecting relationship with respect thereto; and a nut on the outer end of each of said stud bolts; each of said lug members terminating short of the center of the dome-shaped portion of said closure plate.

No references cited.

THERON E. CONDON, *Primary Examiner.*
J. B. MARBERT, *Assistant Examiner.*